Feb. 3, 1931.                J. W. MULLIN                 1,790,943
                          METAL WORKING MACHINE
                          Filed Aug. 3, 1928        8 Sheets-Sheet 1

John W. Mullin
INVENTOR

BY Victor J. Evans
ATTORNEY

WITNESS

Feb. 3, 1931. J. W. MULLIN 1,790,943
METAL WORKING MACHINE
Filed Aug. 3, 1928 8 Sheets-Sheet 3

John W. Mullin
INVENTOR

BY Victor J. Evans
ATTORNEY

WITNESS:

Feb. 3, 1931.  J. W. MULLIN  1,790,943
METAL WORKING MACHINE
Filed Aug. 3, 1928  8 Sheets-Sheet 5

John W. Mullin
INVENTOR
BY Victor J. Evans
ATTORNEY

WITNESS: John Donovan

Feb. 3, 1931.    J. W. MULLIN    1,790,943
METAL WORKING MACHINE
Filed Aug. 3, 1928    8 Sheets-Sheet 8

John W. Mullin
INVENTOR
BY Victor J. Evans
ATTORNEY

WITNESS:

Patented Feb. 3, 1931

1,790,943

UNITED STATES PATENT OFFICE

JOHN W. MULLIN, OF MOUNT VERNON, OHIO

METAL-WORKING MACHINE

Application filed August 3, 1928. Serial No. 297,288.

This invention relates to metal working machines of the multiple tool type, whereby a number of operations may be simultaneously performed, the primary object of the invention being to provide means whereby the tools may be accurately arranged for the work and thereafter secured in position for use, and thus obviate the necessity of stopping the machine while the tools are being adjusted.

Another object of the invention is the provision of a machine in which a number of different operations may be performed without stopping the machine to change tools, means being provided for mounting different tools and selectively bringing them into position during the operation of the machine.

Another object of the invention is the provision of a machine of the above character which includes a reciprocatory tool carriage having means for positioning the tools to engage the work while the carriage is travelling in one direction, and means to position the tools so as to disengage the work while the carriage is travelling in an opposite direction.

With the above and other objects in view, the invention further includes the following novel features and details of construction, to be hereinafter more fully described, illustrated in the accompanying drawings and pointed out in the appended claims.

In the drawings:—

Referring in detail to the drawings, like characters of reference denote corresponding parts throughout the several views.

As illustrated, the machine includes a base A from one end of which rises a spindle housing B and a spindle gear case C, while beneath the latter is the driving shaft housing D. In addition, there is slidingly mounted upon the base A a carriage E.

The base A is of suitable construction and carries guides 15 upon which the carriage E moves, while the spindle housing B rotatably supports a plurality of work carriers or spindles 16 which are adapted to hold the work. These spindles are mounted in suitable bearings provided in the spindle housing and are suitably spaced apart. Any number of spindles may be utilized and they may be spaced in accordance with the character of work to be performed by the machine.

Figure 5:
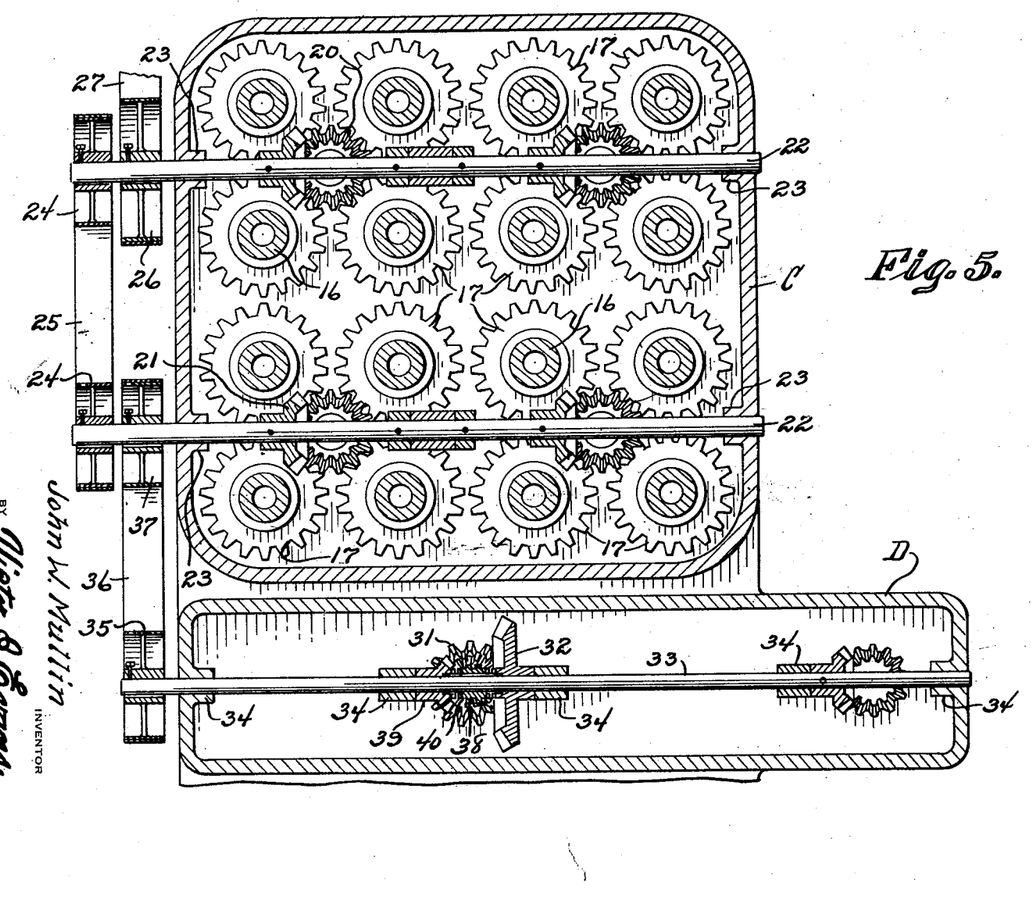
Figures 5, 6, 7 and 8 are sectional views taken respectively on the lines 5—5, 6—6, 7—7 and 8—8 of Figure 1.
Figure 6:
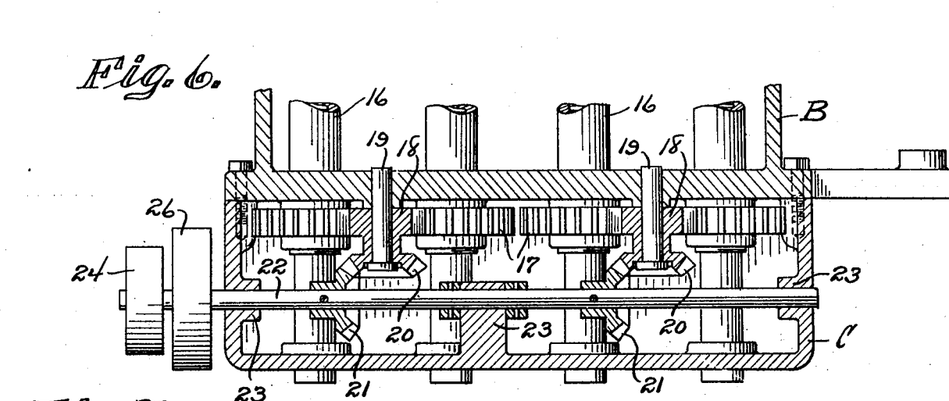
Figure 7:
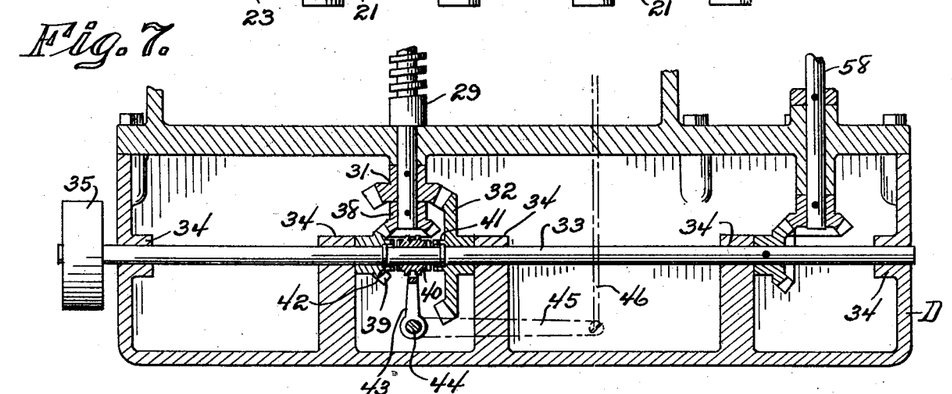

The spindles extend into the spindle gear case C and have fast thereon spur gears 17. These gears are engaged by a gear 18, there being one of the latter for each set of four of the gears 17 as shown in Figure 5 of the drawings. The gears 18 are mounted upon short shafts 19 and are fast with beveled gears 20 which are engaged by beveled gears 21 carried by shafts 22. By reference to Figure 5 of the drawings it will be seen that the gear case accommodates upper and lower shafts 22 which are mounted in suitable bearings 23.

The shafts 22 have pulleys 24 mounted thereon which are connected by belts 25, while the upper shaft 22 has secured thereon a pulley 26. This last mentioned pulley is driven by a belt 27 from a motor 28 or other suitable source of power, the motor being shown as mounted upon the top of the spindle housing B. The work carriers or spindles 16 will thus be simultaneously rotated.

Extending longitudinally through the base beneath the carriage E is a worm shaft 29. This shaft is engaged by an extension 30 which projects downwardly from the carriage into the base through a slot in the latter and which is provided with an interiorly threaded bore. Thus, when the shaft 29 is rotated in one direction, the carriage E will be moved in a direction toward the spindles, while its direction of movement will be reversed by reverse rotation of the shaft. The shaft 29 extends into the driving shaft housing and has mounted thereon a beveled pinion 31. This pinion is engaged by a beveled pinion 32 which is loose upon a driving shaft 33, the latter being mounted in suitable bearings 34 provided in the housing B. The shaft 33 extends through the housing and has mounted thereon a pulley 35 which is driven by a belt 36 from a pulley 37 which is fast on the lower shaft 22. In addition, the shaft 29 has mounted thereon a beveled pinion 38 which is engaged by a beveled pinion 39 loose upon the shaft 33. Splined upon the shaft 33 is a double faced clutch member 40 which is adapted to engage a clutch face 41 provided on the pinion 32 or a clutch face 42 provided on the pinion 29.

The clutch member 40 is engaged by a shifting lever 43 which is mounted upon a post 44 and also mounted upon this post is a lever 45. This last mentioned lever has pivotally connected thereto one end of a shifting rod 46. This rod extends longitudinally of the base and is movable in suitable guides. Adjustably mounted upon the rod are stops 47 and 48.

In its forward movement toward the spindles 16, the carriage is driven through the pinions 31 and 32 until it engages the forward stop 47. During this forward movement the clutch member 40 has engaged the pinion 32, but when the carriage engages the stop 47, the shifting lever 43 will be operated to shift the clutch member from engagement with the pinion 32 into engagement with the pinion 39 so that the direction of movement of the carriage will be reversed due to the reversal in direction of rotation of the shaft 29. As the ratio of the gears 31 and 32 differs from the ratio of the gears 38 and 39, the carriage will move in one direction at a faster rate of speed than it will travel in the other direction.

The carriage E is provided with lateral extensions 49 which provide a relatively wide face which is opposed to the face of the spindle housing B, and this face of the carriage is provided with upper and lower guide grooves 50 within which is mounted a slide 51. This slide is adapted to be moved transversely of the base and for this purpose is provided with an extension 51'. This extension is provided with an interiorly threaded bore whose threads engage a threaded shaft 52. This shaft extends horizontally of the carriage and has loosely mounted thereon a sprocket wheel 53 which is driven by a chain 54 from a sprocket wheel 55.

Figure 1:
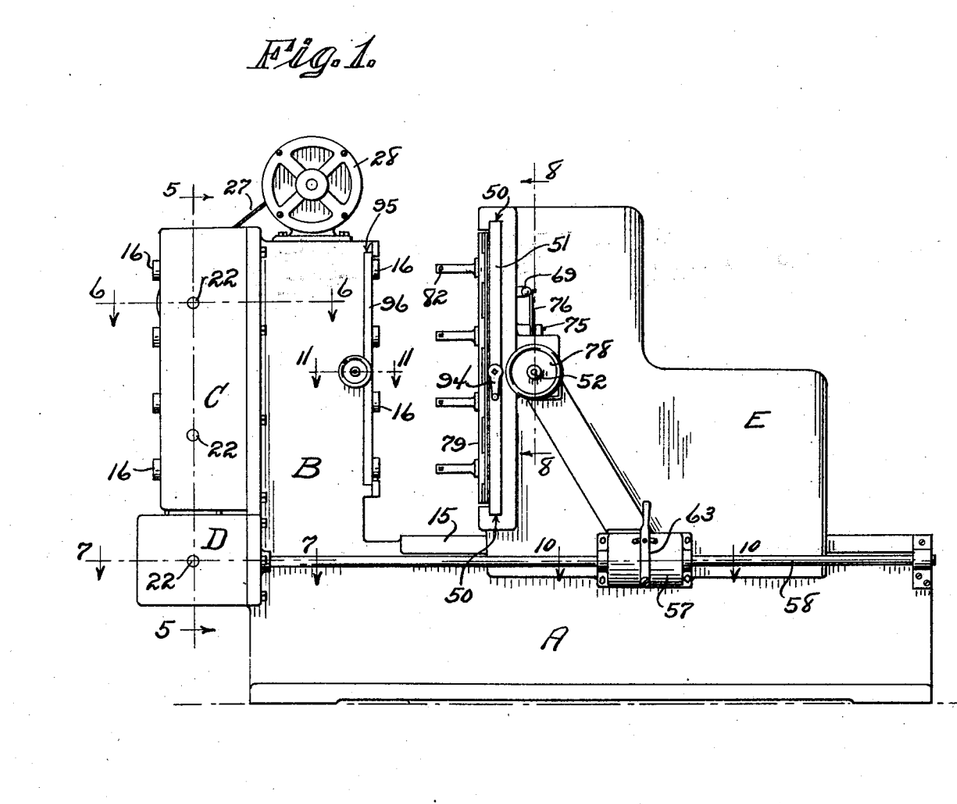
Figure 1 is a side elevation of a machine embodying the invention.
Figure 2:
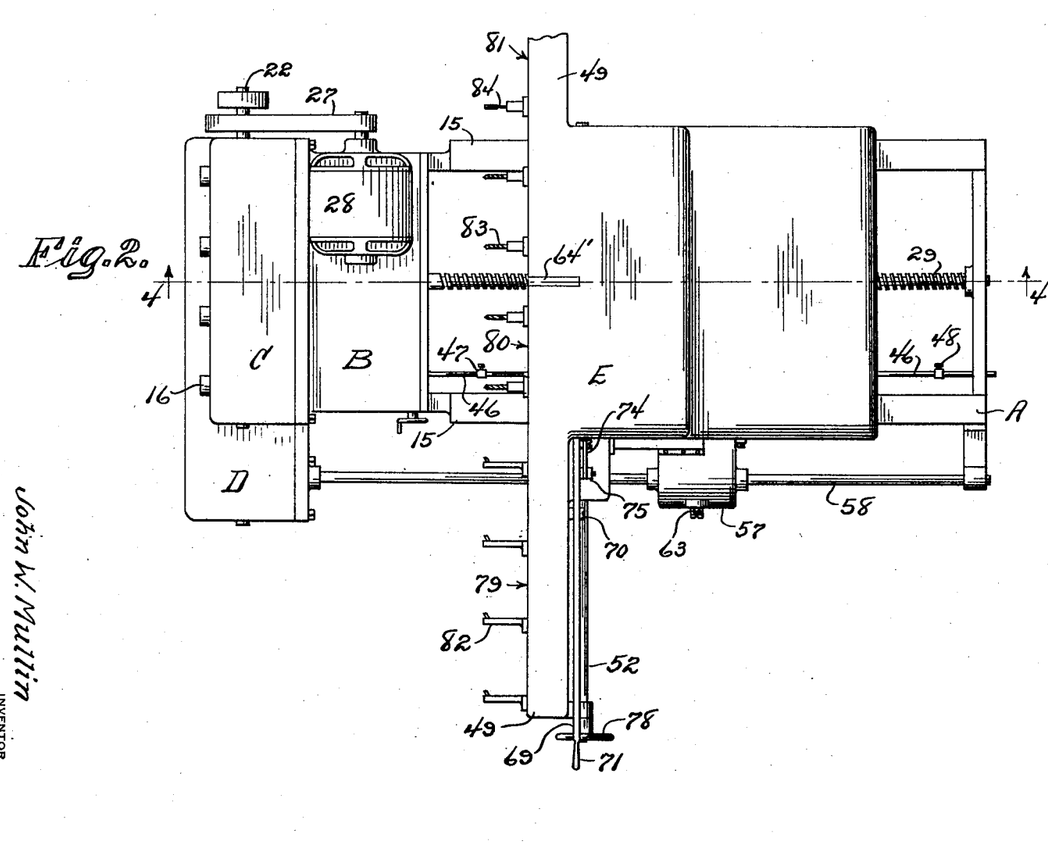
Figure 2 is a top plan view of the same.
Figure 3:
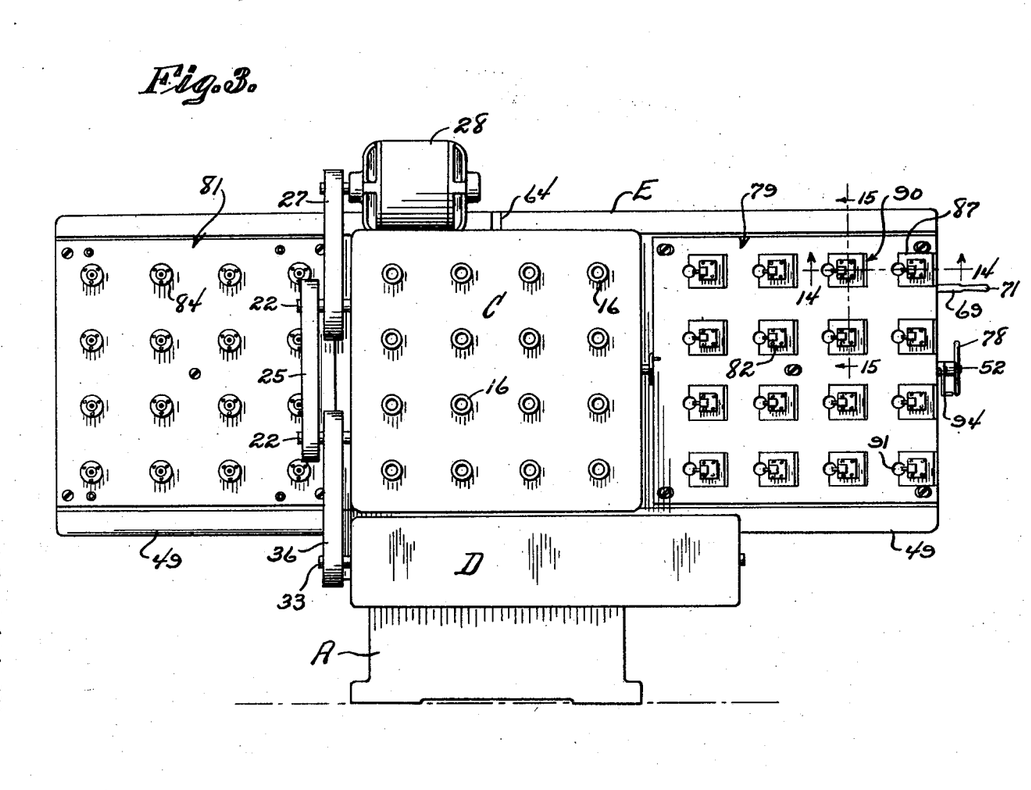
Figure 3 is a rear elevation.
Figure 4:
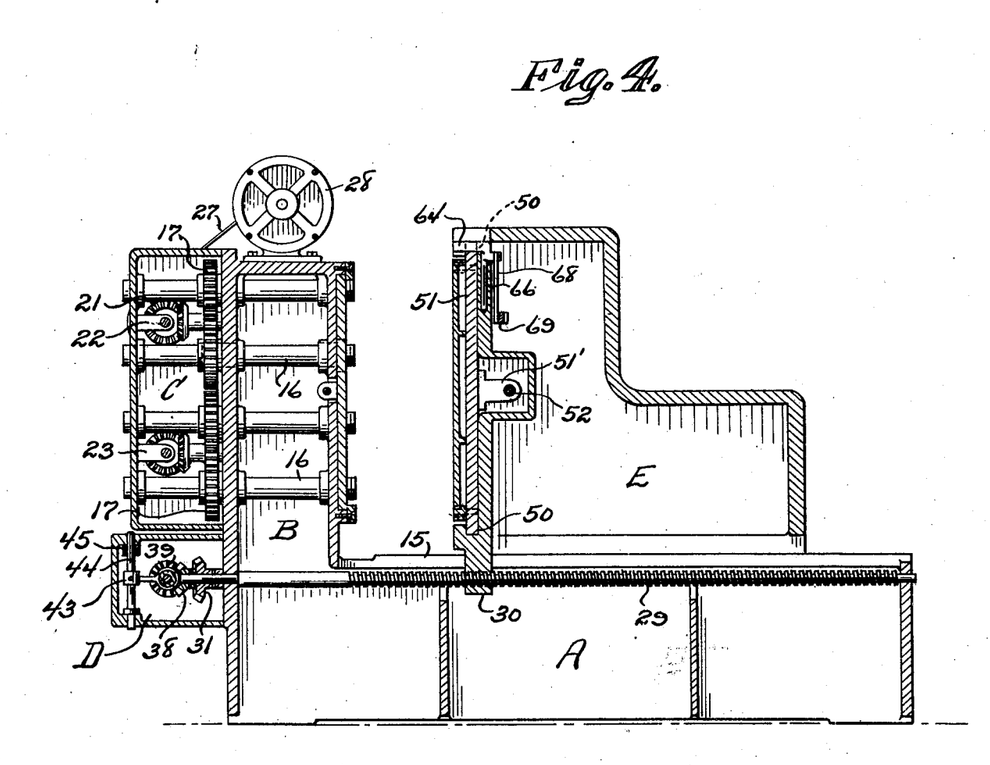
Figure 4 is a sectional view on the line 4—4 of Figure 2.
Figure 10:
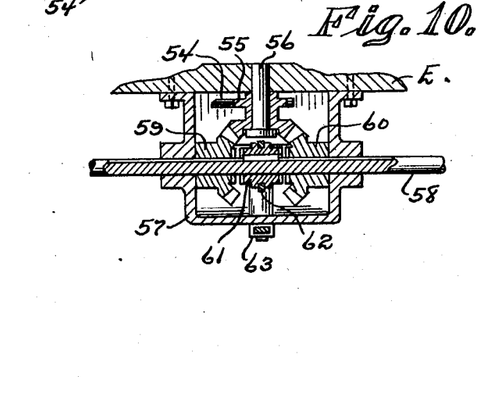
Figure 10 is a like view on the line 10—10 of Figure 1.
Figures 11, 12, 13, 14, 15, 16:
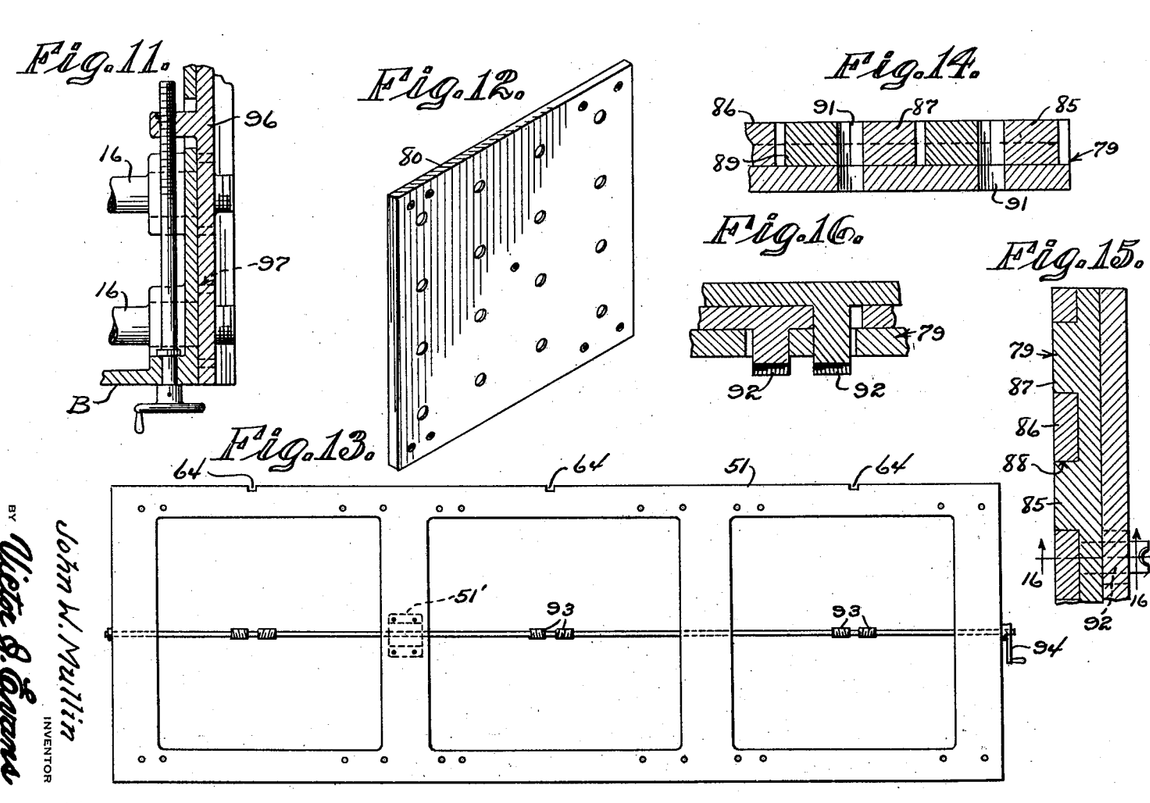
Figure 11 is an enlarged fragmentary sectional view on the line 11—11 of Figure 1.
Figure 12 is a perspective view of one of the non-adjustable plates.
Figure 13 is an elevation of the slide.
Figures 14 and 15 are enlarged fragmentary sections taken respectively on the lines 14—14 and 15—15 of Figure 3.
Figure 16 is a fragmentary section on the line 16—16 of Figure 15.

This last mentioned wheel is loose upon a stub shaft 56 which extends into a case 57, the latter housing a transmission mechanism. This mechanism includes a line shaft 58 which extends from the driving shaft housing D longitudinally of the base through the gear case 58. Mounted for free rotation upon the shaft 58 within the gear case 57 are beveled pinions 59 and 60. Splined upon the shaft 58 is a clutch member 61 which is adapted to operatively engage either the pinion 59 or the pinion 60 and for this purpose has connected thereto a shifting lever 62. This lever is operatively associated with the operating lever 63 upon the outside of the gear case 57, and by reference to Figures 1 and 10 of the drawings it will be seen that when the lever 63 is moved in one direction, the beveled pinion 59 will be fast upon the shaft 58 so as to move the slide 51 in one direction, while movement of the lever 63 in an opposite direction will cause the pinion 60 to be locked upon the shaft 58 and a reverse direction of movement of the slide 51 will occur. In Figure 10 of the drawings, the clutch member 61 is shown in neutral position so that no movement of the slide will occur.

The slide 51 is designed to carry suitable tools to act upon the work carried by the spindles 16, the purpose of moving the slide being to bring into operative position the tools desired to be used. In the machine illustrated three different operations are to be performed and therefore, the slide 51 is adapted to be adjusted to three different positions, although the number of positions of the slide may differ with different machines. For this purpose, the slide is provided with spaced notches 64 which are adapted to be engaged by a dog 65 which is vertically movable. This dog is carried at the upper end of a guide stem 66 which is movable in an opening 67 provided in one wall of the carriage E. Pivotally secured to this dog is an arm 68 and this arm is in turn pivotally secured to a lever 69 which is mounted for pivotal movement as at 70. The outer end of this lever is provided with a handle 71 and is yieldingly held in position to engage the dog in one of the notches 64 by means of a spring 72.

Figure 8:
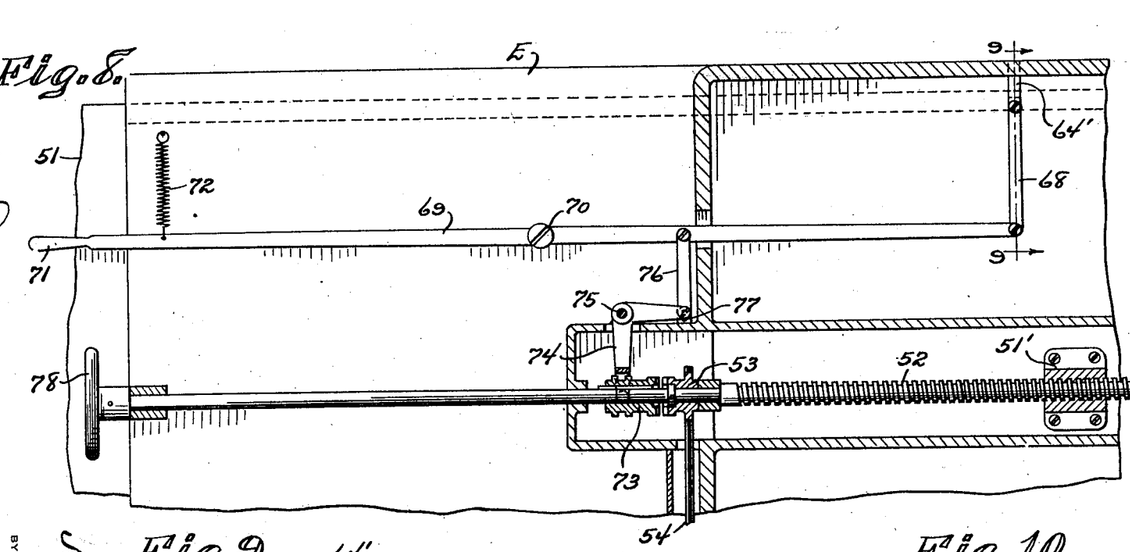
Figure 9:
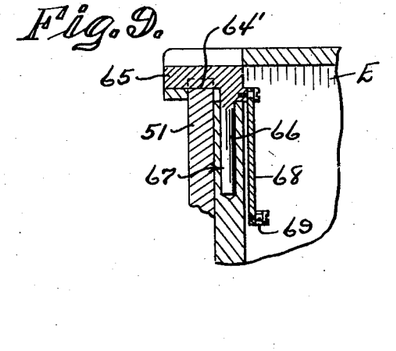
Figure 9 is a fragmentary sectional view taken substantially on the line 9—9 of Figure 8.

By reference to Figures 8 and 9 of the drawings it will be seen that when the handle 71 is moved downward, the dog 65 will be raised and disengaged from the notch 64 so as to permit the slide to move. The notches 64 are so arranged as to bring the tools (to be hereinafter described) into proper position with respect to the spindles 16.

As the sprocket 53 is loose upon the shaft 52, no movement of the slide can occur until this sprocket is locked upon the shaft. To accomplish this there is provided a clutch member 73 which is splined upon the shaft 52 and which when engaged with the sprocket 53 will lock the latter to the shaft. This clutch member is engaged by a shifting lever 74 which is pivotally mounted as shown at 75. The other arm of the lever 74 has a sliding pivotal connection with a link 76 which is pivoted to the lever 69.

By reference to Figure 8 of the drawings it will be seen that as long as the lever 69 is in its normal position and the dog 65 is engaged in one of the notches 64 of the slide 51, no rotation of the shaft 52 can occur. However, when the handle of the lever 69 is moved downward to release the slide, the clutch member 73 will engage the sprocket 53 so as to rotate the shaft 52 and move the slide. The dog 65 will be entirely free of the notch 64 before any movement of the shaft 52 occurs. This is due to the slot 77 in the link 76 whereby a sliding pivotal connection between this link and the lever 74 is effected.

The shaft 52 extends outward and is provided upon its outer end with a hand wheel 78, so that the slide 51 may be moved manually if desired.

The slide 51 is adapted to carry a number of tool carrying plates, the number of these plates and the number of notches 64 in the slide corresponding. These plates are indicated at 79, 80 and 81. Each of these plates carries a particular type of tool and the number of tools carried by each plate corresponds to the number of spindles 16. For example, the tools carried by the plate 79 may be in the form of cutters 82, while the tools of the plate 80 may be drills 83 and the tools of the plate 81 may be taps as indicated at 84.

In operating the machine, the slide 51 is adjusted in the manner previously described so that the tools 82 may be moved into position with respect to the spindles and the carriage operated to move the tools up to the work. After the cutting operation has been completed, the slide 51 may be shifted so as to bring the drills 83 into position for a boring operation, after which the slide may be again shifted to bring the taps 84 into position to thread the bore. If the work is to be externally threaded, different tools may be substituted for the taps 84, while different tools may be also substituted for the tools 82 and 83, in accordance with the work to be performed.

The plates 80 and 81 may be of like construction and are provided with means in the form of dowels or other suitable means whereby the tools 83 and 84 may be removably attached, an important feature of the invention residing in the means whereby the tools may be attached to the plates in a tool room or other place and the plates thereafter attached to the slide 51, so that the machine need not remain idle while the tools are being individually applied. This is also true of the plate 79 which is of a different character than the plates 80 and 81. However as all of the plates are removably attached to the slide any type of plate may be placed in any position upon the slide.

The plate 79 is made up of inner and outer sections, the inner section being indicated at 85 and the outer section at 86. The section 85 is provided with extensions 87 and openings 88, while the outer section 86 is provided with extensions 89 and openings 90, the extensions and openings of the inner section alternating with the extensions and openings of the outer section so that an interlocking engagement between the sections is provided. As the openings 88 and 90 are of greater area than the extensions 87 and 89, the plates may be moved relatively. This is for the purpose of adjusting the positions of the cutters where a cut is made off center so that in a finished cut, the cutter may be brought into engagement with the work during the forward movement of the carriage and disengaged from the work during the rearward movement. The plate 79 is provided with openings 91 through which the work may pass.

To disengage the cutter from the work during the rearward movement of the carriage, the sections 85 and 86 of the plate 79 carry extensions 92 which are provided with internally threaded openings, with the threads of one plate reversed from the threads of the other plate. Engaging the threads of these openings is a right and left hand screw 93 which carries at its outer end a crank arm 94. By rotating the crank arm, the screw 93 will be rotated so that the sections 85 and 86 of the plate 79 will be moved relatively toward and away from one another in accordance with the direction of rotation of the screw.

In addition to the spindles 16, the spindle housing is provided in its face opposed to the carriage E with a guide 95. This guide accommodates a slide 96 which is provided with elongated openings 97 to accommodate the spindles 16. The slide is adapted to carry upon its outer face suitable tools for use with the work carried by the spindles, such as cutting off or notching tools.

It will be apparent from the foregoing description and accompanying drawings that the invention provides a machine wherein work requiring a number of different operations may be performed without removing the same from the machine until the work is completed. The work which is carried by the spindle 16 is acted upon by one group of tools, for example, the group of cutters carried by the plate 79. When this operation is completed, the group of tools carried by the plate 80 may act upon the work, after which the group of tools carried by the plate 81 may be brought into use. By providing a plurality of work carriers or spindles and a corresponding number of tools for each group a number of operations may be made simultaneously and any desired group of tools may be brought into position during the rearward movement of the carriage E so that it will not be necessary to stop the operation of the machine. A most important feature of the invention however resides in the fact that the various tools may be accurately positioned upon the plates before the latter are placed upon the machine, the manner of attaching the tool carrying plates to the slide and the manner of moving and adjustably positioning the slide being such that the tools will be accurately moved into their proper positions with respect to the work.

The machine therefore need not remain idle while the tools are being attached or moved into position to act upon the work.

The invention is susceptible of various changes in its form, proportions and minor details of construction and the right is herein reserved to make such changes as properly fall within the scope of the appended claims.

Having described the invention what is claimed is:

1. In a metal working machine, a plurality of spaced spindles, a carriage movable toward and away from the spindles, a slide mounted upon the carriage for movement at right angles to the axis of the spindles, spaced plates removably mounted upon the slide, tool carriers extending from the plates, said carriers being spaced in conformity with the spacing of the spindles, with the carriers of each plate defining separate tool groups, means to move the slide to position any one of the tool groups with relation to the spindles, means to lock the slide against movement, and means to simultaneously operate the slide locking means and render the slide moving means active or inactive.

2. In a metal working machine, a plurality of spaced spindles, a carriage movable toward and away from the spindles, a slide mounted upon the carrier for movement at right angles to the axis of the spindles, spaced plates removably mounted upon the slide, tool carriers extending from the plates, said carriers being spaced in conformity with the spacing of the spindles, with the carriers of each plate defining separate tool groups, means to move the slide to position any one of the tool groups with relation to the spindles, means to lock the slide against movement, a clutch to control the slide moving means, a lever to operate the slide locking means, and means connecting the lever and clutch to provide for simultaneous operation of said locking means and clutch.

3. In a metal working machine, a plurality of spaced spindles, a carriage movable toward and away from the spindles, a slide mounted upon the carriage for movement at right angles to the axis of the spindles, spaced plates removably mounted upon the slide, tool carriers extending from the plates, said carriers being spaced in conformity with the spacing of the spindles, with the carriers of each plate defining separate tool groups, means to move the slide to position any one of the tool groups with relation to the spindles, means to lock the slide against movement, and means to adjust the plates with respect to the slide to position the tool carriers with relation to the spindles.

4. A metal working machine including a base and a power source, a spindle housing at one end of the base, a plurality of spindles carried by the housing, means rotating said spindles from the power source, a carriage slidably mounted on the base, means to move the carriage towards and from the spindles by said power source, a slide mounted on the carriage for movement at right angles to the axis of the spindles and having spaced notches, plates removably mounted on the slide, tool carriers extending from the plates and having groups of tools of different characters, a locking means to engage any of said notches to hold the tools relative to the spindles, and means cooperating with the locking means and actuated by the power source to move the slide laterally of the spindles.

In testimony whereof I affix my signature.

JOHN W. MULLIN.